US012122333B1

(12) United States Patent
Thompson et al.

(10) Patent No.: US 12,122,333 B1
(45) Date of Patent: Oct. 22, 2024

(54) PARKING BRAKE

(71) Applicant: Parker-Hannifin Corporation, Cleveland, OH (US)

(72) Inventors: Randall D. Thompson, Lancaster, SC (US); Jason S. Richardson, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 407 days.

(21) Appl. No.: 17/692,309

(22) Filed: Mar. 11, 2022

Related U.S. Application Data

(60) Provisional application No. 63/238,827, filed on Aug. 31, 2021, provisional application No. 63/215,536, filed on Jun. 28, 2021.

(51) Int. Cl.
*B60T 1/00* (2006.01)
*B60K 7/00* (2006.01)
*B60T 11/04* (2006.01)

(52) U.S. Cl.
CPC ............ *B60T 1/005* (2013.01); *B60K 7/0015* (2013.01); *B60K 2007/0092* (2013.01); *B60T 11/04* (2013.01)

(58) Field of Classification Search
CPC ....... B60T 1/005; B60T 11/04; B60K 7/0015; B60K 2007/0092
USPC ...................................................... 188/69, 84
See application file for complete search history.

(56) References Cited

U.S. PATENT DOCUMENTS

| 8,573,368 | B2 | 11/2013 | Stover et al. | |
|---|---|---|---|---|
| 2015/0152928 | A1 | 6/2015 | Yoon | |
| 2016/0061324 | A1* | 3/2016 | Sten | B60T 1/005 |
| | | | | 192/219.5 |
| 2019/0242477 | A1* | 8/2019 | Schulze | B60T 1/005 |

FOREIGN PATENT DOCUMENTS

| CN | 2556775 Y | 6/2003 |
|---|---|---|
| CN | 101996814 B | 8/2013 |
| CN | 105123085 A | 12/2015 |

\* cited by examiner

*Primary Examiner* — Xuan Lan Nguyen
(74) *Attorney, Agent, or Firm* — McDonnell Boehnen Hulbert & Berghoff LLP

(57) ABSTRACT

An example assembly comprises: a brake shaft comprising gear teeth formed on a circumferential portion of the brake shaft, wherein the brake shaft is substantially constrained from moving in a longitudinal direction along a longitudinal axis of the brake shaft; and a brake gear that is rotatably coupled to a drive shaft of a motor, wherein the brake shaft is rotatable about the longitudinal axis between (i) a first position at which the gear teeth of the brake shaft are disengaged from the brake gear, thereby allowing the brake gear and the drive shaft to rotate, and (ii) a second position at which the gear teeth of the brake shaft engage the brake gear, thereby precluding the brake gear and the drive shaft from rotating due to the brake shaft being constrained from moving in the longitudinal direction.

20 Claims, 12 Drawing Sheets

PARKING BRAKE

CROSS REFERENCE TO RELATED APPLICATION

The present application claims priority to U.S. Provisional Application No. 63/215,536 filed on Jun. 28, 2021 and U.S. Provisional Application No. 63/238,827 filed on Aug. 31, 2021, the entire contents of all of which are herein incorporated by reference as if fully set forth in this description.

TECHNICAL FIELD

This disclosure relates to parking brake assemblies for use in vehicles such as lawn and garden tractors, stand-on mowers, walk-behind snow throwers and mowers, and the like. More particularly, the present disclosure relates to a parking brake using gear teeth of a brake shaft to selectively engage a corresponding gear on a drive shaft to prevent the drive shaft from rotating.

BACKGROUND

Conventional mowers are typically driven by dual hydrostatic transmissions, one hydrostatic transmission for each wheel, powered by belts and pulleys from an internal combustion engine. The hydrostatic transmissions can be used to brake or slow down the mower during its operation, e.g., when the engine is turned on. However, when the engine is turned off, the hydrostatic transmission might be not be operational and might not be used to keep the mower parked and secure it in-place.

Some conventional mowers have friction brakes such as drum-type brakes. In such type of brakes, an operator can actuate a parking brake, thereby causing brake shoes to be pushed outward to engage a drum coupled to a hub of the wheel of the mower. Engagement or friction between the shoes and the drum, prevent the drum and the wheel from rotating.

These conventional systems involving drum-type brakes can be costly. Friction type brakes are designed to provide peak load requirements upon every application and release cycle creating an over-designed mechanism. Further, engaging a drum-type brake can require a large force from the operator, which may be undesirable. Also, the braking force applied by the drum-type brake varies based on direction of rotation of the wheel. As such, the braking force can be inconsistent.

Another example brake involves a cog type brake, which is configured to be applied and released under the current loading condition. A conventional cog type parking brake, however, requires lubrication to reduce friction encountered when applying or releasing the brake, and such lubrication reduces the holding force of the brake from rotational forces.

It may thus be desirable to have a positive locking parking brake for use with a vehicle (e.g., a mower) that is easier to engage or actuate, less costly than friction type brakes, and configured to apply a consistent braking force that is not affected by direction of rotation of the wheel or lubrication. It is with respect to these and other considerations that the disclosure made herein is presented.

SUMMARY

The present disclosure describes implementations that relate to a parking brake.

In a first example implementation, the present disclosure describes an assembly. The assembly comprises: a brake shaft comprising gear teeth formed on a circumferential portion of the brake shaft, wherein the brake shaft is substantially constrained from moving in a longitudinal direction along a longitudinal axis of the brake shaft; and a brake gear that is rotatably coupled to a drive shaft of a motor. The brake shaft is rotatable about the longitudinal axis between (i) a first position at which the gear teeth of the brake shaft are disengaged from the brake gear, thereby allowing the brake gear and the drive shaft to rotate, and (ii) a second position at which the gear teeth of the brake shaft engage the brake gear, thereby precluding the brake gear and the drive shaft from rotating due to the brake shaft being constrained from moving in the longitudinal direction.

In a second example implementation, the present disclosure describes a vehicle comprising: a motor having a drive shaft configured as an output shaft of the motor; a wheel rotatably coupled to the drive shaft of the motor; and the assembly of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

In examples, a mower can be slowed down or braked during operation using hydrostatic transmissions that transmit power from an engine to the wheels of the lawn mower. It may be desirable to have a parking brake that can preclude the mower from moving when the mower is parked and the engine is turned off. It may also be desirable for the brakes to be applied without a large actuation force and to apply a consistent braking force. Disclosed herein are assemblies, systems, and methods for a positive locking parking brake using gear engagement, and configured to apply a consistent brake force.

Figure 1:
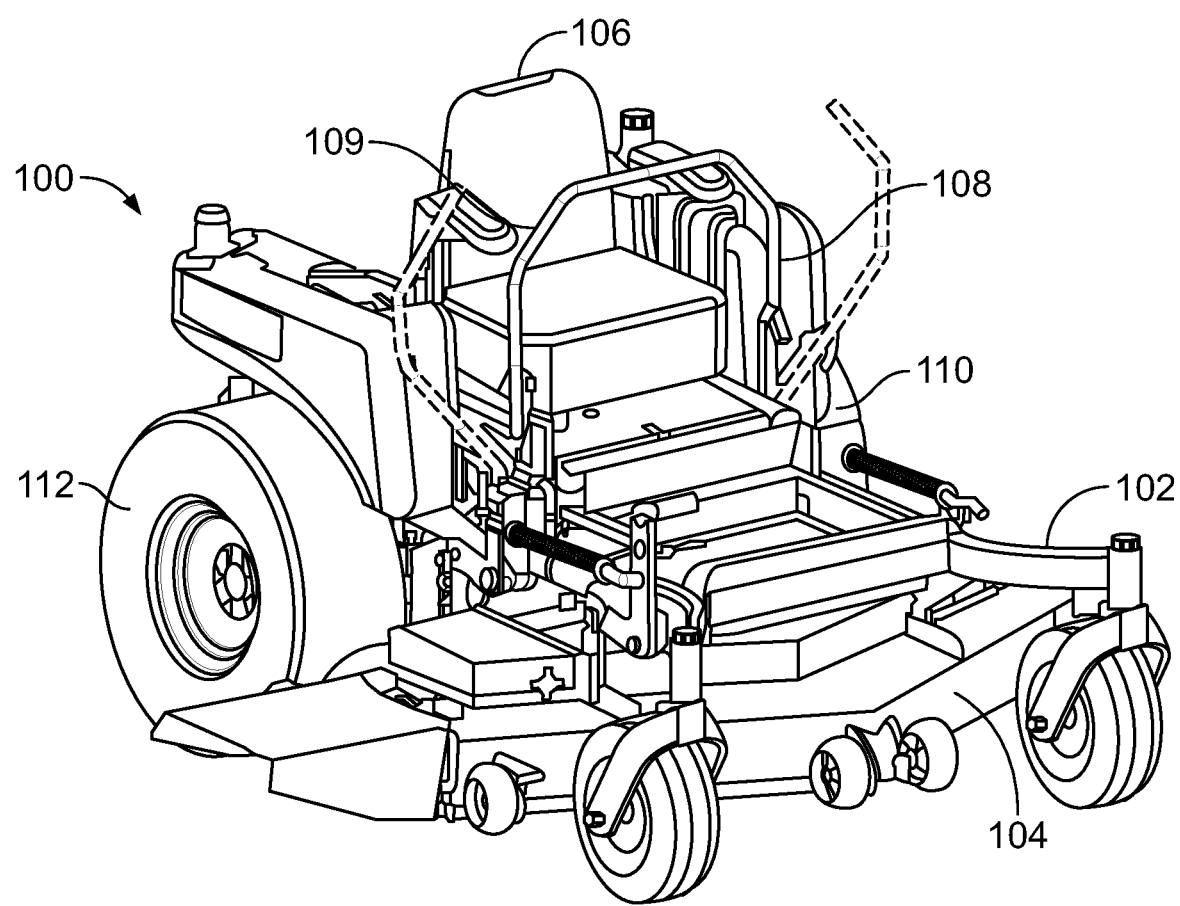
FIG. 1 illustrates a perspective view of a mower, in accordance with an example implementation.

FIG. 1 illustrates a perspective view of a mower 100, in accordance with an example implementation. The mower 100 can be, for example, zero-turn-radius mower (e.g., a lawn mower with a turning radius that is effectively zero).

The mower 100 includes a frame 102. The mower 100 also includes a mower deck 104 supported by the frame 102 for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can, for example, be an internal combustion engine configured to provide power to a drive system coupled to respective rear wheels such as left wheel 110 and right wheel 112 that drive the mower 100.

Each wheel of the wheels 110, 112 can be independently controlled via respective hydrostatic transmissions, and the steering control levers 108, 109 can be configured to control speed and direction of the wheels 110, 112 via actuating the respective hydrostatic transmissions. Thus, the drive system can be controlled by an operator to independently drive the wheels 110, 112 to propel the mower 100. The configuration of the mower 100 is an example configuration and it should be understood that other mower configurations and vehicle types can be used.

The hydrostatic transmissions can also be used to brake the mower 100 during operation when the engine is running. When the engine is turned off, however, the hydrostatic transmissions might not be capable of securing the mower 100 in a parked stated. A parking brake using a gear arrangement for positive locking is turned off is disclosed herein.

Figure 2:
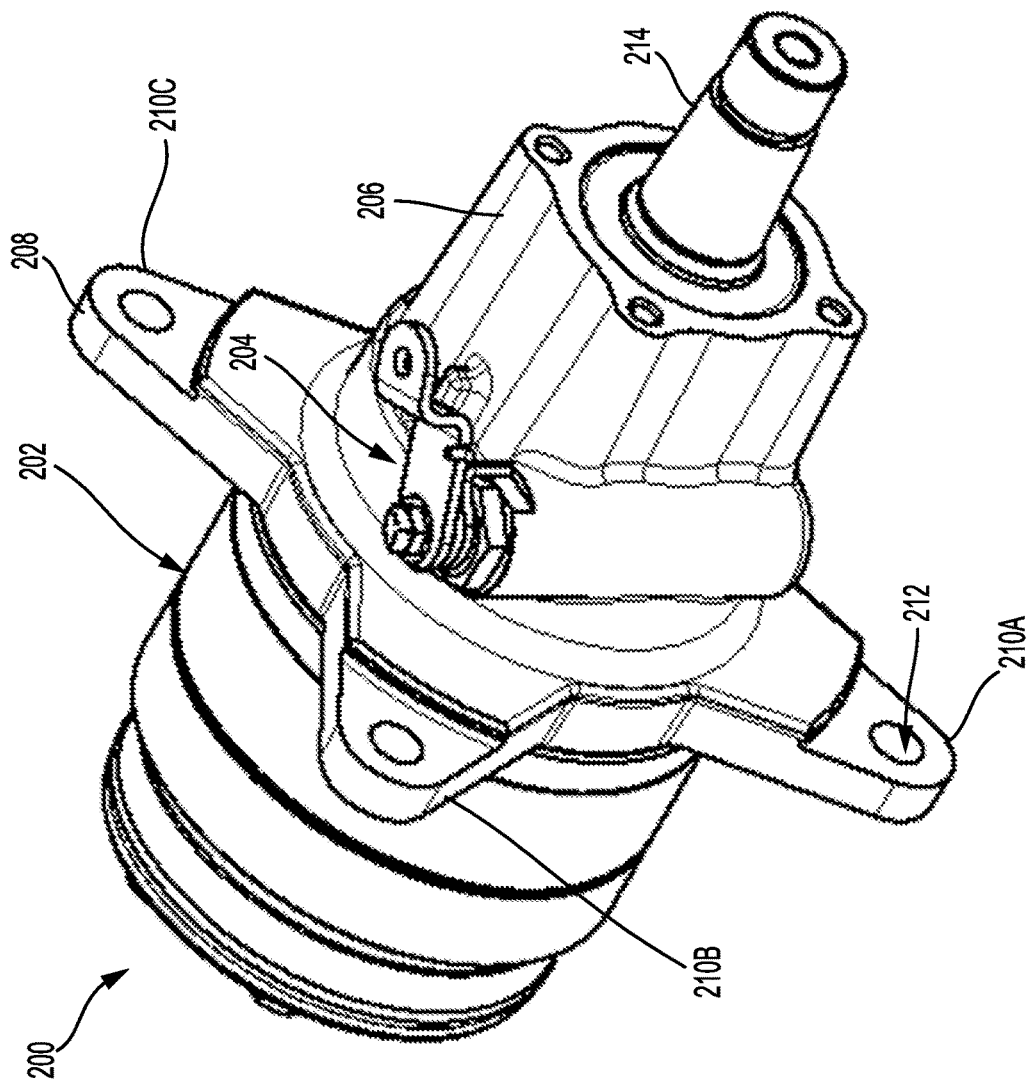
FIG. 2 illustrates a perspective view of an assembly including a hydraulic motor of a hydrostatic transmission and a brake assembly, in accordance with an example implementation.

FIG. 2 illustrates a perspective view of an assembly 200 including a hydraulic motor 202 of a hydrostatic transmission and a brake assembly 204, in accordance with an example implementation. The assembly 200 includes a housing 206 in which portions of the brake assembly 204 are disposed. A hydraulic motor is used herein as an example motor. Other types of motors (e.g., an electric motor) can be used.

The housing 206 includes a mounting flange 208 that is configured to be coupled to the frame of the vehicle (e.g., the mower 100) to mount the hydrostatic transmission that includes the hydraulic motor 202 to the vehicle. The mounting flange 208 has a mounting pattern with several holes to allow fasteners to couple the hydrostatic transmission to the vehicle.

In the example implementation of FIG. 2, the mounting flange 208 is integrated with the housing 206 of the hydraulic motor 202. In other words, the housing 206 and the mounting flange 208 can be a single component, e.g., can be cast as a single component, and therefore this configuration may eliminate the need for a separate bracket that couples the hydraulic motor 202 to the frame of the vehicle.

Figure 5:
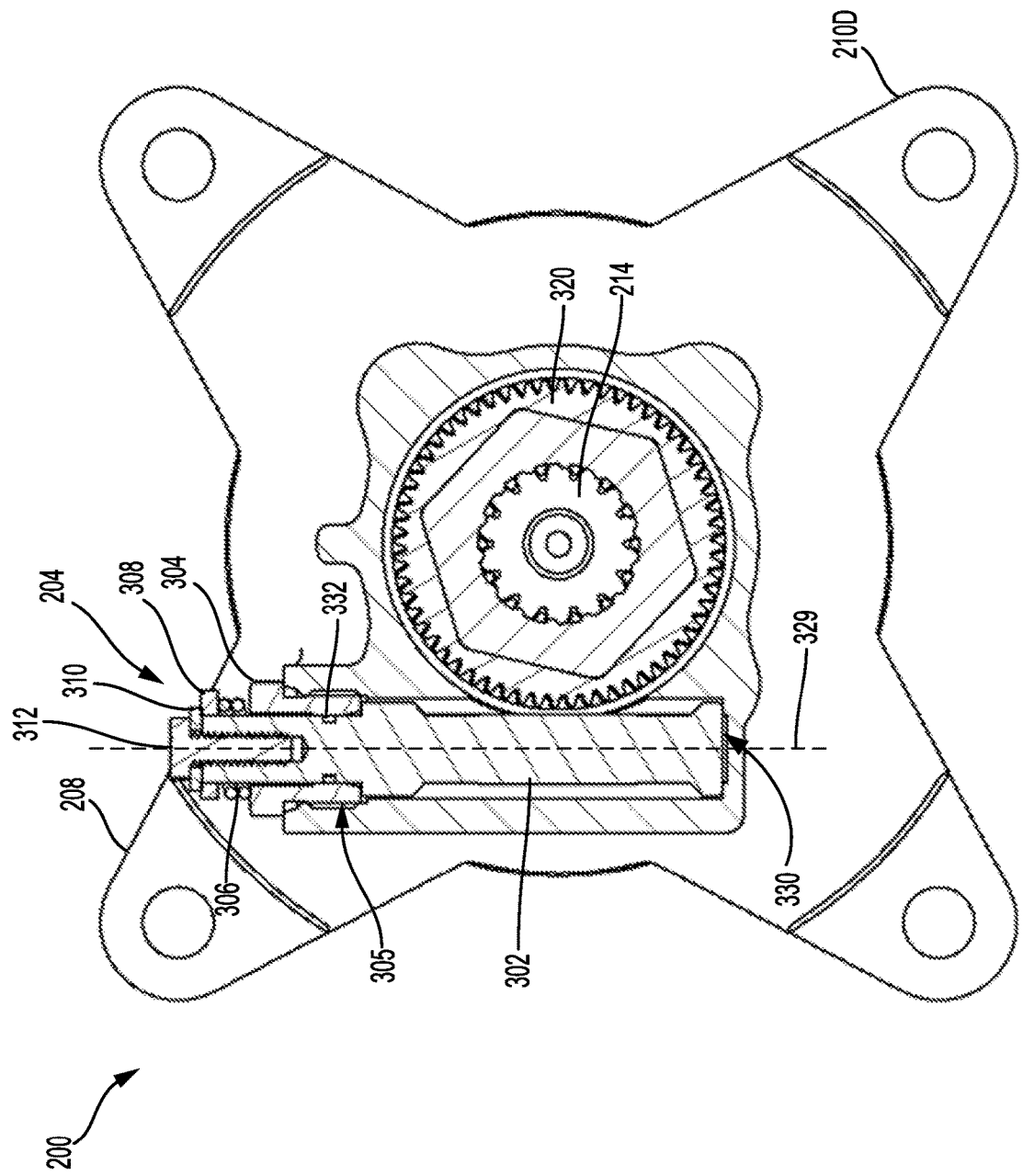
FIG. 5 illustrates a cross-sectional front view of the assembly of FIG. 1 when gear teeth of a brake shaft are disengaged from a brake gear, in accordance with an example implementation.

As depicted in FIG. 2, the mounting flange 208 includes a plurality of mounting plates or mounting "ears" such as four mounting ears 210A, 210B, 210C, and 210D (mounting ear 210D is shown in FIG. 5) that protrude radially outward. Each mounting ear 210A-210D has a respective hole. For example, the mounting ear 210A has a hole 212. The holes of the mounting ears 210A-210D accommodate or receive fasteners that couple the hydrostatic transmission to the frame of the vehicle. The number and configuration of the mounting ears 210A-210D facilitate spreading the torque or vehicle load across more fasteners than conventional configurations described above. Thus, each fastener can carry less load, and the reliability of the hydrostatic transmission can increase.

The hydraulic motor 202 includes a rotating group of components that rotates as pressurized fluid is provided from a pump of the hydrostatic transmission to the hydraulic motor 202. For example, the hydraulic motor 202 can have pistons disposed in a piston block and interface with a tilted swash plate. Due to the tilted swash plate being tilted, as pressurized fluid is drawn into the hydraulic motor 202, the pistons reciprocate and rotate with the piston block.

The assembly 200 includes a drive shaft 214 that is rotatably coupled to the piston block, such that as the piston block rotates, the drive shaft 214 rotates therewith. As such, the drive shaft 214 is configured as an output shaft of the hydraulic motor 202.

Further, a wheel of a vehicle (e.g., the wheel 110 or the wheel 112 of the mower 100) is mounted, or rotatably coupled, to the drive shaft 214. With this configuration, as the drive shaft 214 rotates, the wheel rotates, thereby propelling the vehicle.

When the vehicle is parked, the brake assembly 204 is used to brake the vehicle, i.e., prevent the vehicle from moving once parked (e.g., prevent the vehicle from rolling down a hill or move unintentionally after being parked). As shown, the brake assembly 204 is integrated in the housing 206 of the hydraulic motor 202.

Figure 3:
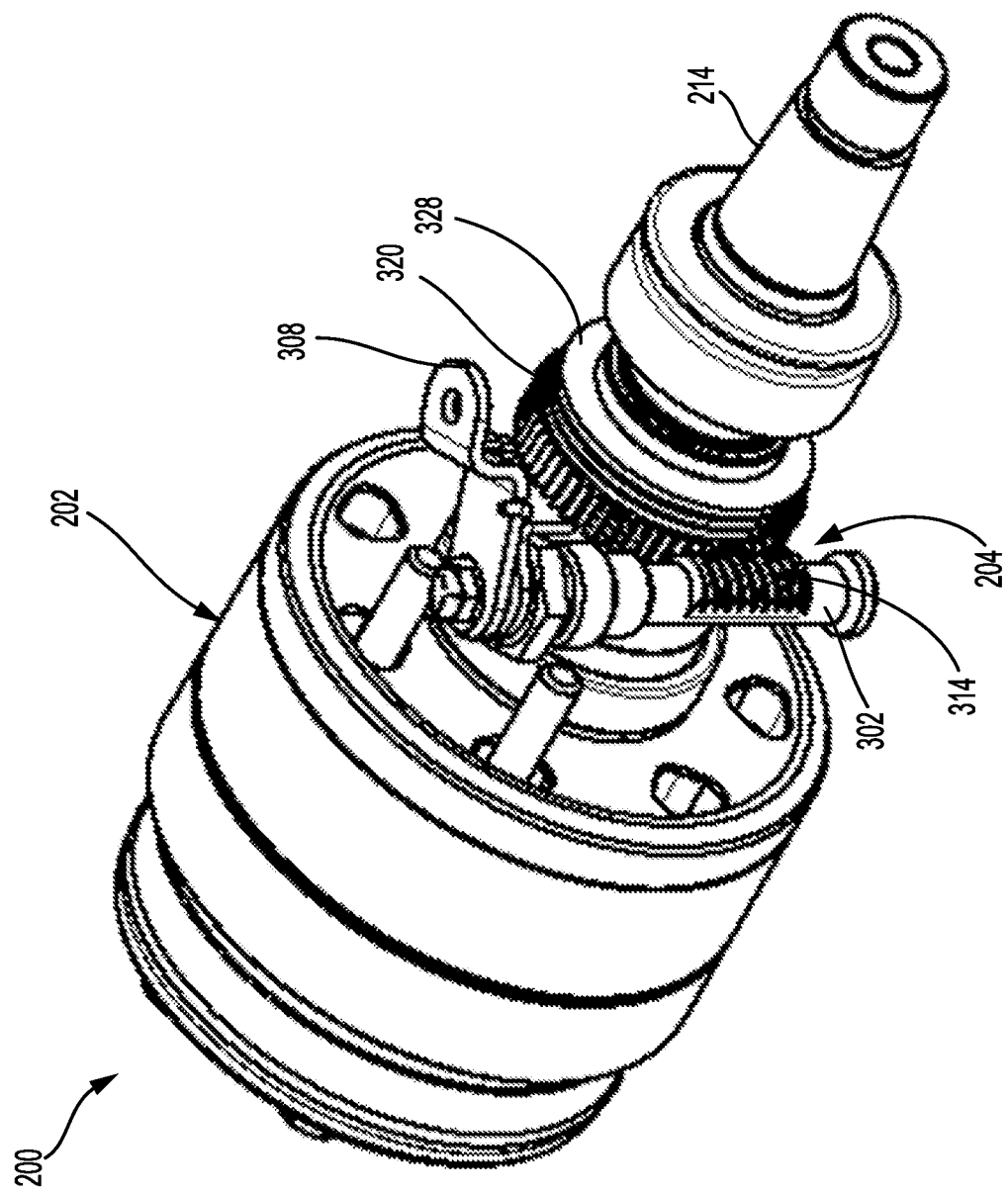
FIG. 3 illustrates a partial perspective view of the assembly of FIG. 1, in accordance with an example implementation.
Figure 4:
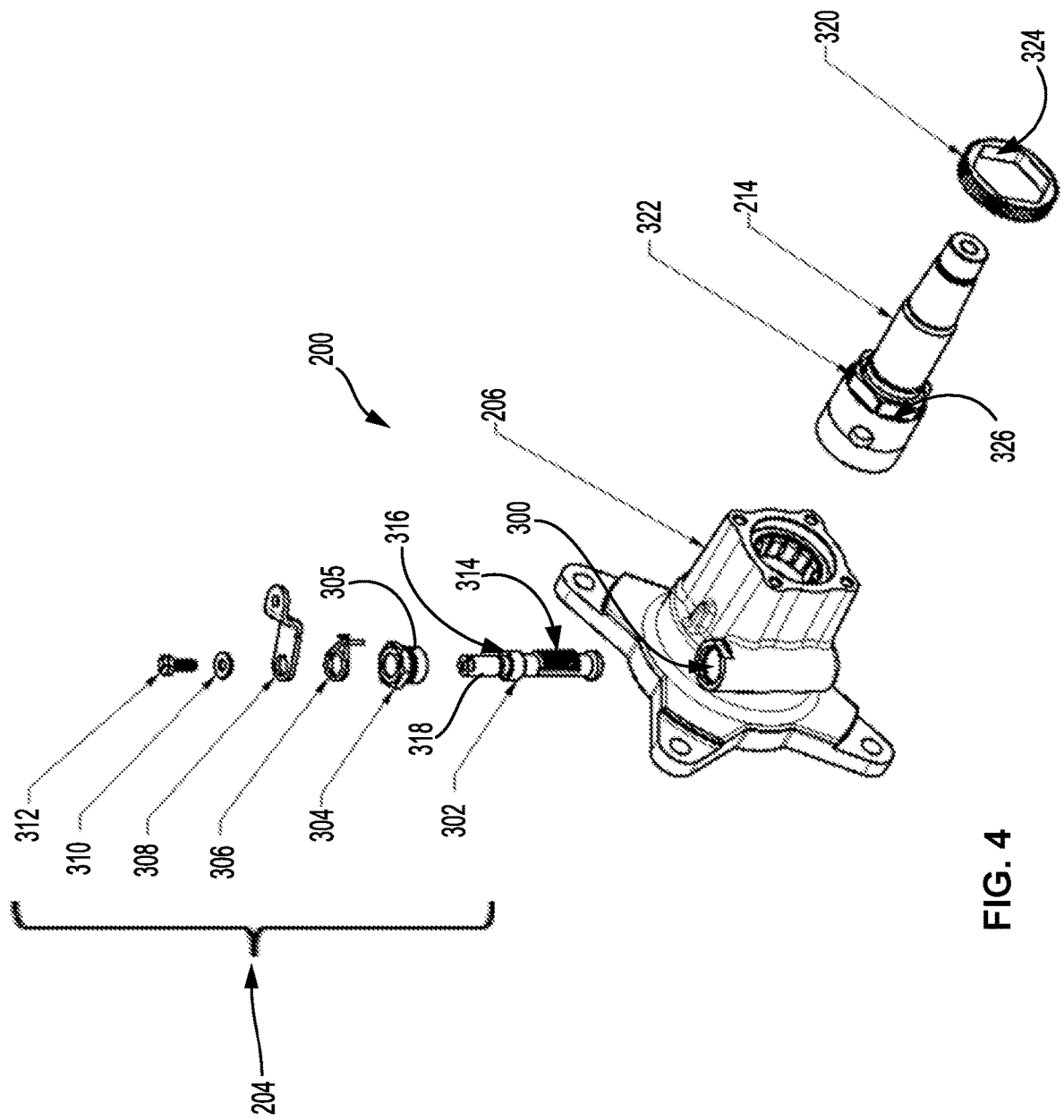
FIG. 4 illustrates a partial exploded view of the assembly of FIG. 1, in accordance with an example implementation.

FIG. 3 illustrates a partial perspective view of the assembly 200, and FIG. 4 illustrates a partial exploded view of the assembly 200, in accordance with an example implementation. Particularly, FIG. 3 illustrates the assembly 200 without the housing 206, and FIG. 4 illustrates an exploded view of the assembly 200 without the hydraulic motor 202. FIGS. 3-4 illustrate details of the brake assembly 204 and are described together.

The housing 206 has a cavity 300 (see FIG. 4) configured to receive some components of the brake assembly 204. In an example, the cavity 300 can be configured as a Society of Automotive Engineers (SAE) type threaded port with an O-ring seal to preclude fluid leakage to an external environment of the assembly 200.

The brake assembly 204 includes a pin or brake shaft 302, a fitting 304, a torsional spring 306, a brake lever 308, a washer 310, and a screw 312. The brake shaft 302 is disposed transversely relative to the drive shaft 214, e.g., a longitudinal axis of the brake shaft 302 is perpendicular to a respective longitudinal axis of the drive shaft 214.

The brake shaft 302 is disposed in the cavity 300, at least partially, within the housing 206. The brake shaft 302 includes gear teeth 314 on a portion of the brake shaft 302. The gear teeth 314 are formed on a longitudinal portion as well as a circumferential portion of the brake shaft 302. In other words, the gear teeth 314 are formed on one side of the circumference of the brake shaft 302, while the other side or portion of the circumference is non-teethed (i.e., has no gear teeth). The other side of the brake shaft 302 that does not include teeth can be flat or cylindrical.

In an example, the gear teeth 314 are straight teeth or non-angled teeth, and in this example, the brake shaft 302 is configured as a gear rack. In another example, the teeth can be angled similar to a worm, and in this example, the brake shaft 302 can be referred to as a worm screw that can have helical or spiral teeth.

The fitting 304 has threads 305 (see also FIGS. 5, 7) configured to engage with respective threads formed in an interior surface of the housing 206 that bounds the cavity 300. As such, the fitting 304 is threadedly engaged with the housing 206.

The brake shaft 302 further includes a shoulder 316 that is configured to interact with the fitting 304 such that the fitting 304 operates as a stop for the brake shaft 302 as described below. Further, the fitting 304 has a hole that receives a portion 318 of the brake shaft 302 therethrough, and the portion 318 includes a threaded hole that receives the screw 312. The screw 312 couples the brake lever 308 to the brake shaft 302, such that the brake lever 308 can rotate the brake shaft 302 around its longitudinal axis (i.e., longitudinal axis 329 shown in FIG. 5).

The torsional spring 306 is mounted about the exterior surface of the brake shaft 302. In an example implementation, the torsional spring 306 is configured as a return spring that returns or biases the brake lever 308 to an unactuated position where the brakes are disengaged. However, in other example implementation, the torsional spring 306 can be configured to bias the brake lever 308 to an actuated position where the brakes are engaged.

The assembly 200 further includes a brake gear 320, which can be considered part of the brake assembly 204. The brake gear 320 is rotatably coupled to the drive shaft 214, directly or indirectly.

For example, the brake gear 320 can be mounted to the drive shaft 214. For instance, the brake gear 320 can be made integral with the drive shaft 214. In another example, the brake gear 320 can be coupled to the drive shaft 214 via any mechanism. For instance, the brake gear 320 can have a keyway and the drive shaft 214 may have a key slot, and a key can be used to couple the brake gear 320 to the drive shaft 214.

In another example implementation shown in FIGS. 2-4, the drive shaft 214 has an external polygonal interface such as external hexagonal interface 322 formed on an exterior surface thereof. The brake gear 320 in turn has an internal polygonal interface such as internal hexagonal interface 324. The brake gear 320 is mounted to the drive shaft 214 such that the internal hexagonal interface 324 of the brake gear 320 mates or interfaces with the external hexagonal interface 322 of the drive shaft 214. This way, as the drive shaft 214 rotates, the brake gear 320 rotates therewith. A hexagonal shape is used herein as an example, and other polygonal shapes could be used.

Further, the brake gear 320 interfaces longitudinally with, and rests against, a shoulder 326 formed in the drive shaft 214. On the other side of the brake gear 320, a thrust bearing 328 (shown in FIG. 3) can be used to facilitate rotation of the brake gear 320.

The brake gear 320 is configured to correspond to the gear teeth 314 of the brake shaft 302. For example, if the gear teeth 314 are straight teeth, the brake gear 320 is configured as a spur gear. If the gear teeth 314 are helical or spiral as in the case of a worm gear configuration, the brake gear 320 is configured as a helical gear, and so on. In an example, in the case of a worm gear configuration the transfer of torque is rotational, thereby facilitating engagement and release the brake as they involve less friction than a spur gear or straight teeth configuration.

The brake assembly 204 is configured as a parking brake that can be engaged and disengaged based on the rotational position of the brake lever 308. Particularly, the brake lever 308 is configured to rotate the brake shaft 302 about the longitudinal axis 329 between (i) a first position at which the gear teeth 314 of the brake shaft 302 are disengaged from the brake gear 320, thereby allowing the brake gear 320 and the drive shaft 214 to rotate, and (ii) a second position at which the gear teeth 314 of the brake shaft 302 engage the brake gear 320, thereby precluding the brake gear 320 and the drive shaft 214 from rotating (i.e., braking position).

When the gear teeth 314 of the brake shaft 302 are disengaged from the brake gear 320, the brakes are disengaged, and the drive shaft 214 rotates freely. Conversely, when the brake shaft 302 rotates via the brake lever 308 such that the gear teeth 314 of the brake shaft 302 engages the brake gear 320, the brakes are engaged, thereby precluding the drive shaft 214 from rotating, i.e., the drive shaft 214 is precluded from rotation due to positive locking of the brake shaft 302 with the brake gear 320.

FIG. 5 illustrates a cross-sectional front view of the assembly 200 when the gear teeth 314 of the brake shaft 302 are disengaged from the brake gear 320, in accordance with an example implementation. FIG. 5 corresponds to FIG. 3 as both figures show the gear teeth 314 being disengaged from the brake gear 320. In this position of the brake lever 308 and brake shaft 302 shown in FIGS. 3, 5, the drive shaft 214 and the brake gear 320 are free to rotate and the brakes are disengaged. To brake the vehicle in a parked position, an operator rotates the brake lever 308, e.g., counter-clockwise from a top view perspective, about a longitudinal axis 329 of the brake shaft 302 to cause the gear teeth 314 of the brake shaft 302 to engage with the teeth of the brake gear 320.

Figure 6:
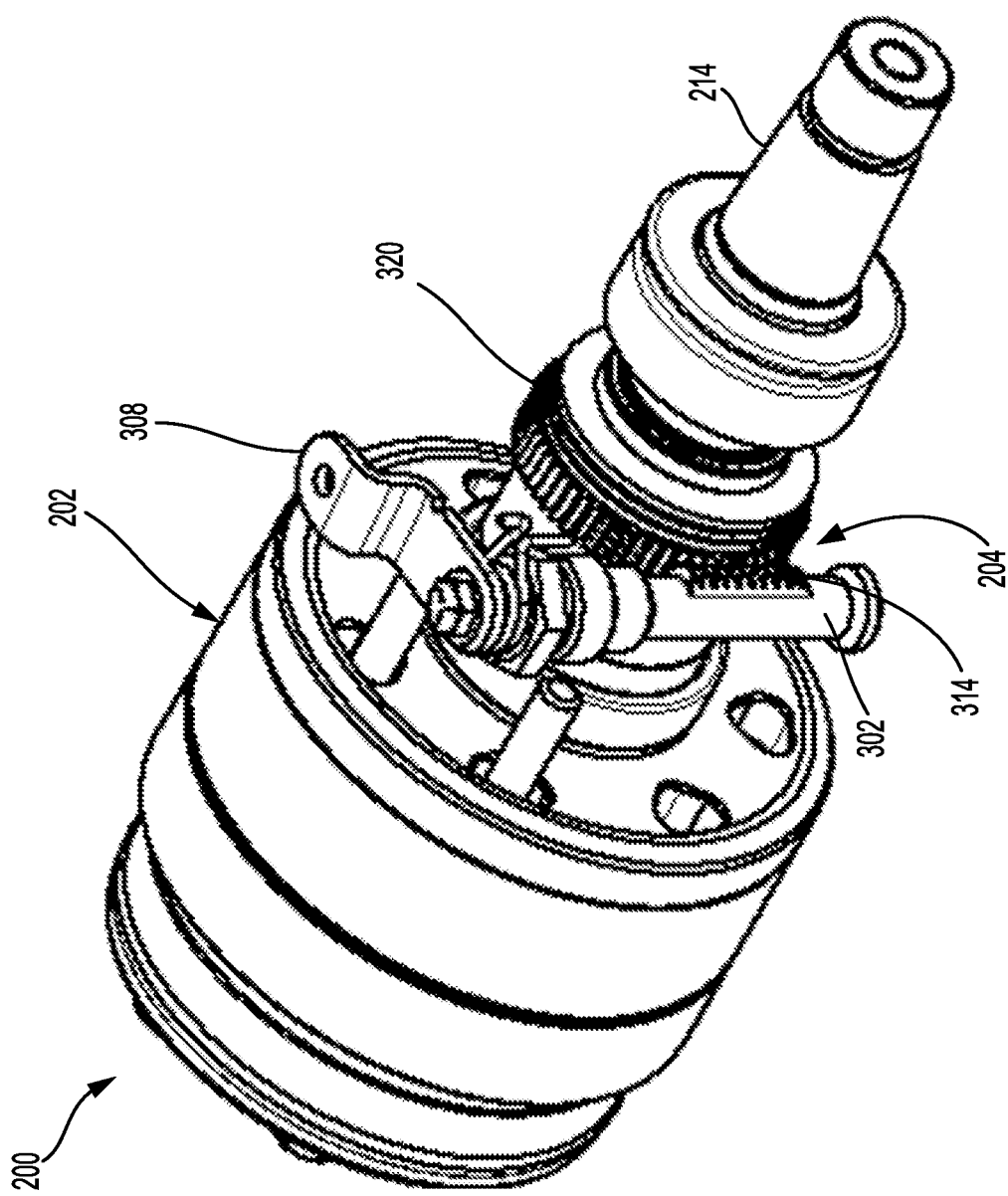
FIG. 6 illustrates a partial perspective view of the assembly of FIG. 1 showing gear teeth of a brake shaft engaged with a brake gear, in accordance with an example implementation.
Figure 7:
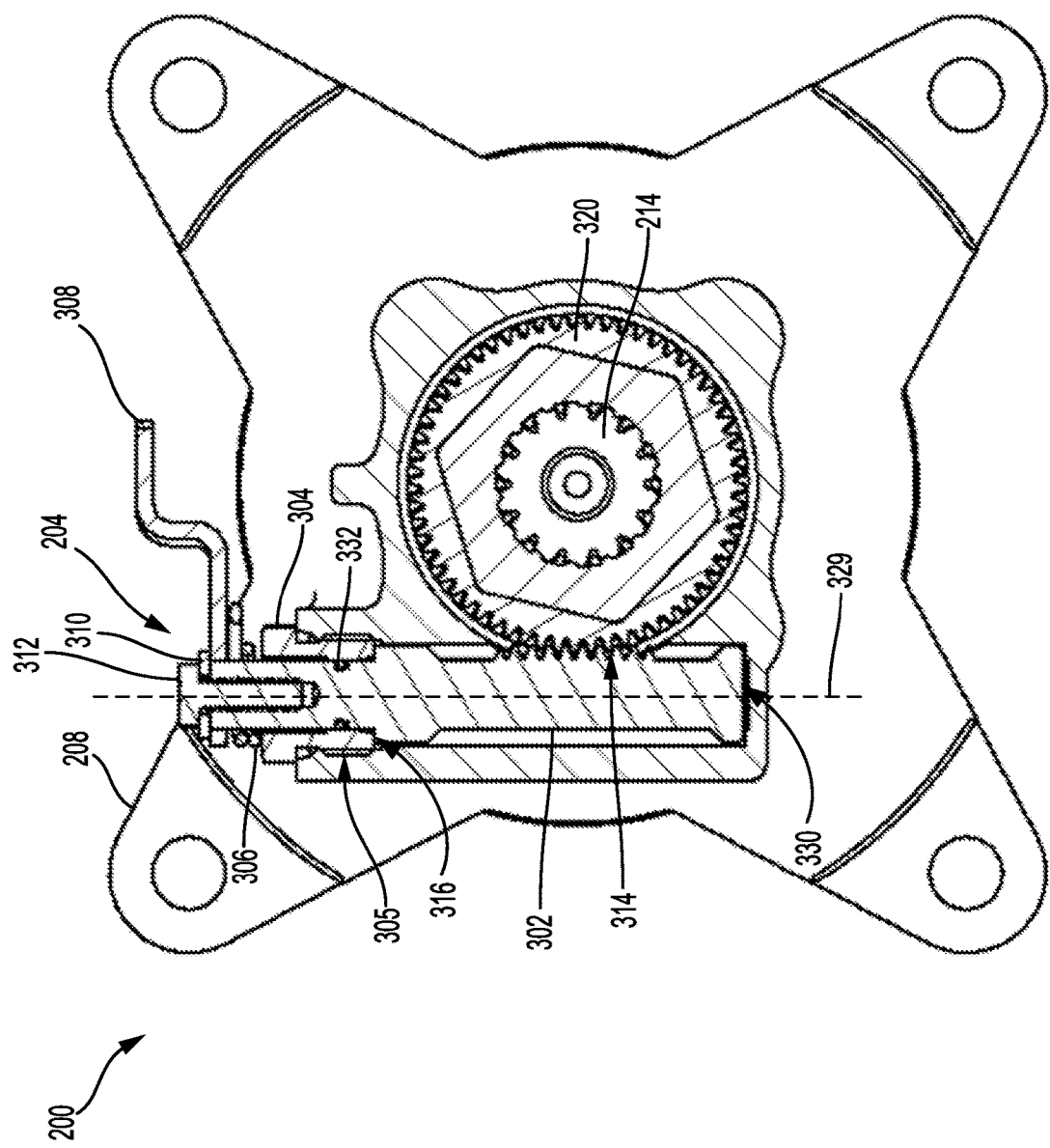
FIG. 7 illustrates a cross-sectional front view of the assembly of FIG. 1 when a gear teeth of a brake shaft are engaged with a brake gear, in accordance with an example implementation.

FIG. 6 illustrates a partial perspective view of the assembly 200 showing the gear teeth 314 of the brake shaft 302 engaged with the brake gear 320, and FIG. 7 illustrates a cross-sectional front view of the assembly 200 when the gear teeth 314 of the brake shaft 302 are engaged with the brake gear 320, in accordance with an example implementation. The vehicle may have a button or lever mechanism that is coupled (e.g., mechanically, fluidly, or electrically) to the brake lever 308 to enable the operator to rotate the brake lever 308 and engage the brakes.

Thus, the operator can rotate the brake lever 308 (e.g., counter-clockwise from a top view perspective in FIGS. 2-3) to the position shown in FIGS. 6-7. If the gear teeth 314 of the brake shaft 302 are aligned with the teeth of the brake gear 320, the brake shaft 302 engages the brake gear 320. If, however, the gear teeth 314 of the brake shaft 302 are misaligned with the teeth of the brake gear 320, wheel and the vehicle may roll or move slightly so that the drive shaft 214 and the brake gear 320 rotate to a rotational position at which the gear teeth 314 of the brake shaft 302 are aligned with the teeth of the brake gear 320, thereby allowing the brake shaft 302 to engage the brake gear 320 (i.e., allow the respective gear teeth of the brake shaft 302 and the brake gear 320 to mesh). In an example, to limit rollout or movement of the vehicle while the brake shaft 302 engages with the brake gear 320, a large number of teeth can be used. FIGS. 6-7 depict the gear teeth 314 of the brake shaft 302 engaged with the teeth of the brake gear 320.

The brake shaft 302 is substantially constrained from moving in a longitudinal direction (i.e., along the longitudinal axis 329) by the fitting 304 in one direction (upward direction) and the interior surface 330 of the housing 206 in the opposite direction (downward direction). The term "substantially constrained" is used herein to indicate that the brake shaft 302 is configured to have only some "axial play" such that it can move or slide transversely (e.g., up and down in FIGS. 6-7) for a small distance along the longitudinal axis 329. Beyond such "axial play," movement of the brake shaft 302 is constrained. For example, the brake shaft 302 can move in either direction by less than 1.0 millimeter.

If the vehicle (e.g., the mower 100) is parked in a position where the drive shaft 214 and the brake gear 320 tend to rotate in a clockwise direction from the perspective of FIG. 7, the brake gear 320 drives the brake shaft 302 in a first direction, e.g., upward direction in FIG. 7. The shoulder 316 of the brake shaft 302 is then forced against an end of the fitting 304, which thus operates as a stop that prevents the brake shaft 302 from moving further in an upward direction. As a result, the brake gear 320 and the drive shaft 214 are also precluded from rotating, i.e., brakes are applied and the vehicle does not move.

Conversely, if the vehicle (e.g., the mower 100) is parked in a position where the drive shaft 214 and the brake gear 320 tend to rotate in a counter-clockwise direction from the perspective of FIG. 7, the brake gear 320 drives the brake shaft 302 in a second direction (e.g., downward direction in FIG. 7) opposite the first direction. The end of the brake shaft 302 is then forced against an interior surface 330 of the housing 206 that bounds the cavity 300 at the bottom thereof. As such, the brake shaft 302 is precluded from moving further in a downward direction. As a result, the brake gear 320 and the drive shaft 214 are also precluded from rotating, i.e., brakes are applied and the vehicle does not move.

Thus, when the brake lever 308 rotates the brake shaft 302 to the position shown in FIGS. 6-7, the brakes are applied and the vehicle remains stationary. The rotational force or moment of the drive shaft 214 and the brake gear 320 (e.g., resulting from the weight of the vehicle disposed on an inclined surface) is transmitted as a linear force to the brake shaft 302, which is then precluded from moving via the fitting 304 and the housing 206.

To release the brakes, the operator may rotate the brake lever 308 in the opposite direction to disengage the gear teeth 314 from the teeth of the brake gear 320. Additionally or alternatively, when the operator releases the brakes (e.g., presses a button or moves a lever connected to the brake lever 308), the torsional spring 306 returns the brake shaft 302 to the position shown in FIGS. 3, 5 at which the brake gear 320 and the drive shaft 214 are allowed to rotate.

When the brake shaft 302 is in the position shown in FIGS. 6-7, it is loaded in a given direction, e.g., it supports the weight of the vehicle positioned on a ramp, for example. It may thus be desirable in some cases to reduce friction between the brake shaft 302 and the fitting 304 or the housing 206 to facilitate rotating the brake shaft 302 back to the disengaged position.

In an example, to facilitate rotation of the brake shaft 302 back to the disengaged position (FIG. 3, 5) without causing galling between the fitting 304 and the brake shaft 302, a washer or bushing can be placed at the interface between the shoulder 316 and the end of the fitting 304. Such washer or bushing can be made of bronze, Teflon®, or any similar material, for example. Similarly, a washer or bushing can be placed at the interface between the end of the brake shaft 302 and the interior surface 330 of the housing 206. However, in other examples, the brake shaft 302 and/or the housing 206 can be made of a hardened material (e.g., hardened steel) and a washer/bushing might not be used.

Additionally or alternatively, in another example, to facilitate rotation of the brake shaft 302 as well as engagement and disengagement of the gear teeth 314 of the brake shaft 302 with the teeth of the brake gear 320, the housing 206 may be filled with a lubricant fluid. Such a lubricant fluid protects the gear teeth, reduces friction between the gear teeth, and cools the surfaces of the gear teeth. In this example, the brake assembly 204 includes a seal 332 (e.g., an O-ring) disposed in a groove formed on an exterior surface of the brake shaft 302 to preclude fluid leakage to an external environment.

Advantageously, having lubricant oil within the housing 206 does not affect the braking performance of the brake assembly 204. Particularly, while the lubricant oil facilitates rotational motion of the brake shaft 302, the lubricant fluid does not reduce the brake holding capability (i.e., the linear force holding capability) of the brake shaft 302 as such force is in a direction that is not affected by the presence of the lubricant fluid. The holding capability is achieved due to engagement of the gear teeth 314 of the brake shaft 302 with the corresponding gear teeth of the brake gear 320 and the linear retention of the brake shaft 302 regardless of the presence of the lubricant oil.

Although the configuration shown in FIGS. 2-7 involves mounting the brake assembly 204 within the housing 206, in other examples, it may be desirable to mount it external to the housing 206. For instance, it may be desirable in some applications to make the brake gear larger to reduce the linear force transmitted to the brake shaft, and in such applications the brake gear can be placed outside the housing 206 to allow a larger gear to be used.

Figure 8:
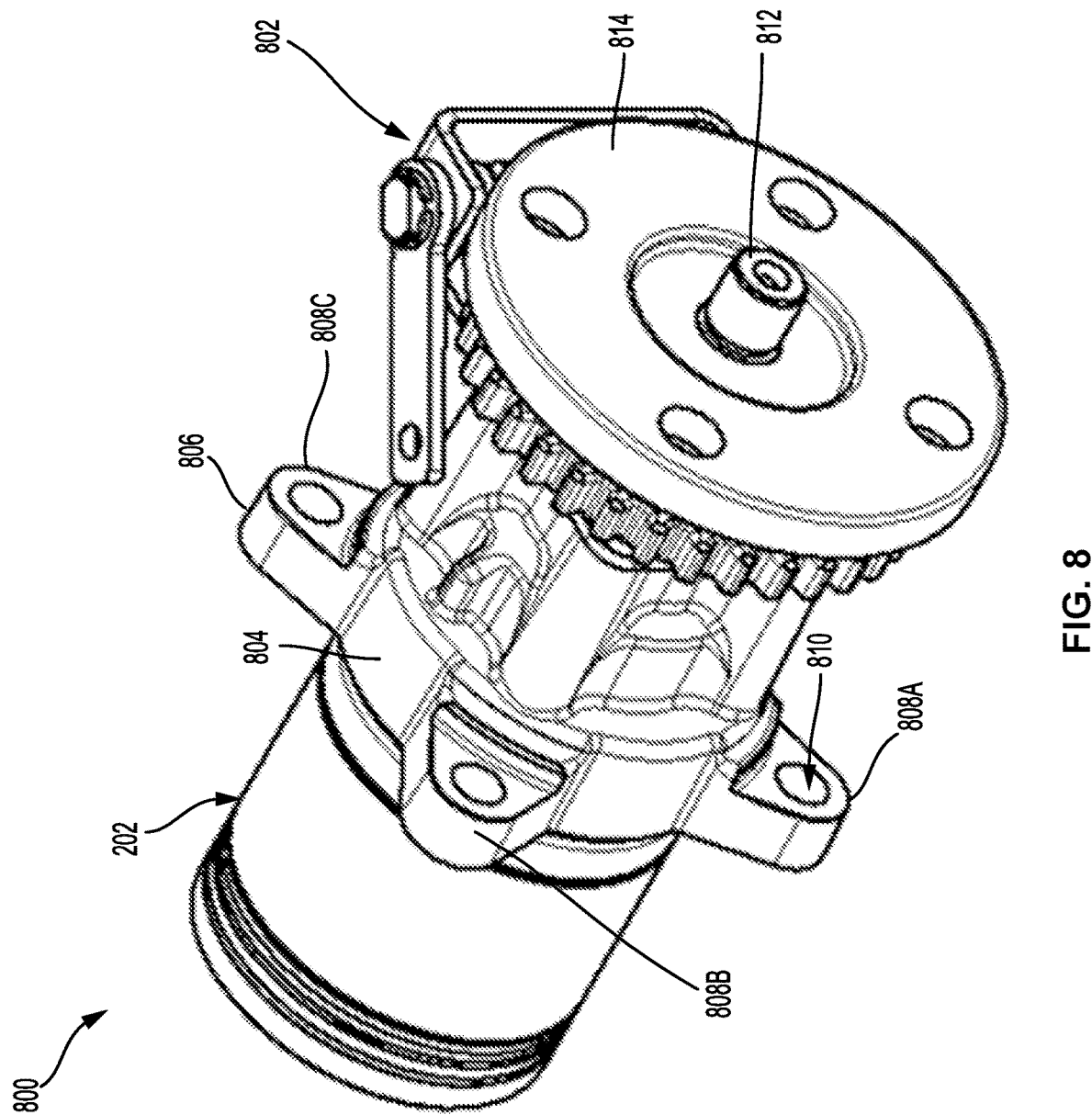
FIG. 8 illustrates a perspective view of another assembly including a hydraulic motor of a hydrostatic transmission and a brake assembly mounted external to a housing, in accordance with an example implementation.

FIG. 8 illustrates a perspective view of another assembly 800 including the hydraulic motor 202 of a hydrostatic transmission and a brake assembly 802 mounted external to a housing 804, in accordance with an example implementation. The housing 804 includes a mounting flange 806 (similar to the mounting flange 208) that is configured to be coupled to the frame of the vehicle (e.g., the mower 100) to mount the hydrostatic transmission that includes the hydraulic motor 202 to the vehicle. The mounting flange 806 has a mounting pattern with several holes to allow fasteners to couple the hydrostatic transmission to the vehicle.

In the example implementation of FIG. 8, the mounting flange 806 is integrated with the housing 804 of the hydraulic motor 202. In other words, the housing 804 and the mounting flange 806 can be a single component, e.g., can be cast as a single component, and therefore this configuration can eliminates the need for a separate bracket that couples the hydraulic motor 202 to the frame of the vehicle.

Figure 12:
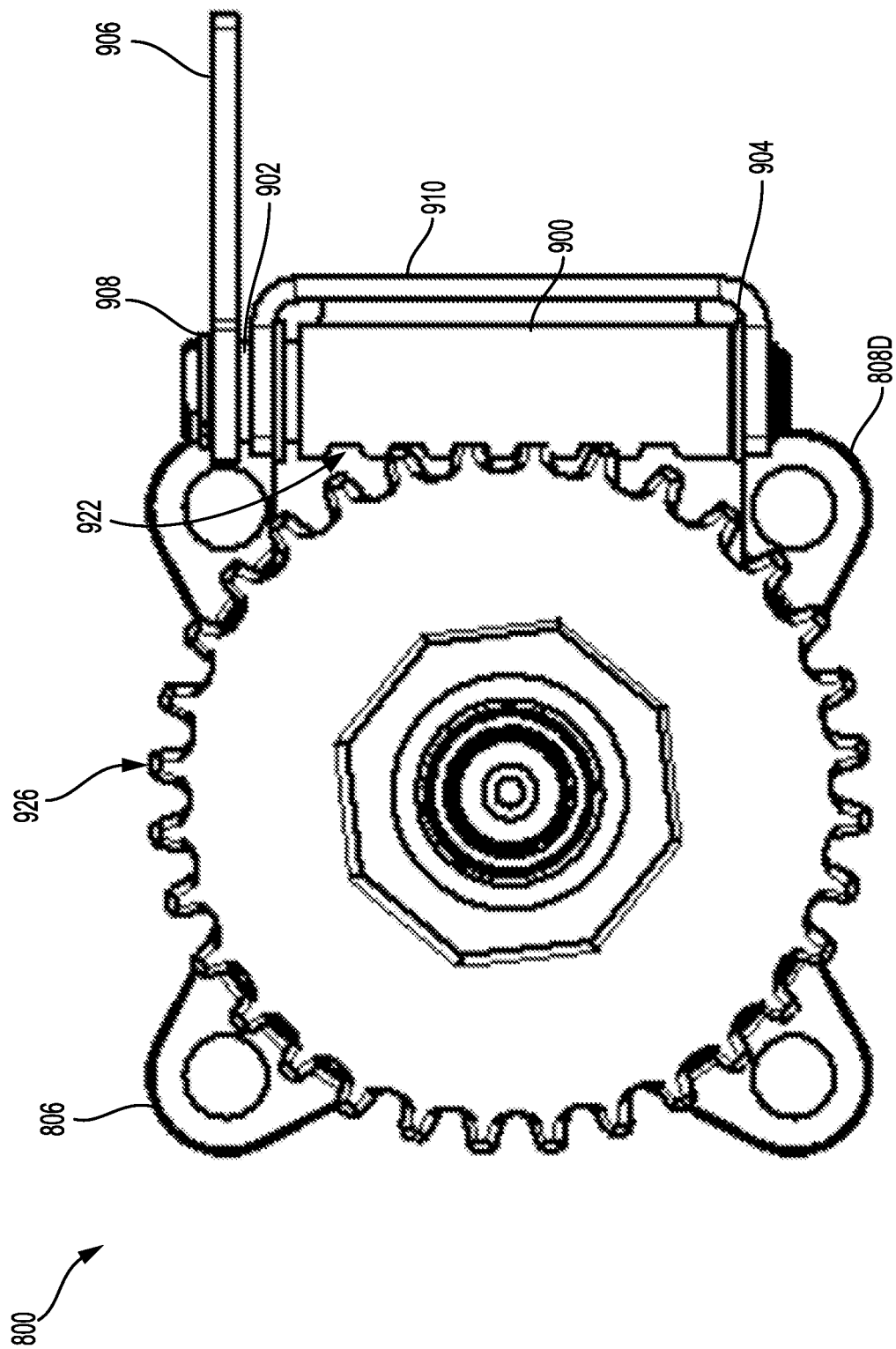
FIG. 12 illustrates a front view of the assembly of FIG. 8 when gear teeth of a brake shaft are engaged with a brake gear, in accordance with an example implementation.

As depicted in FIG. 8, the mounting flange 806 includes a plurality of mounting plates or mounting "ears" such as four mounting ears 808A, 808B, 808C, and 808D (the mounting ear 808D is shown in FIG. 12) that protrude radially outward. Each mounting ear 808A-808D has a respective hole, e.g., the mounting ear 808A has a hole 810.

The holes of the mounting ears 808A-808D accommodate or receive fasteners that couple the hydrostatic transmission to the frame of the vehicle. The number and configuration of the mounting ears 808A-808D facilitate spreading the torque or vehicle load across more fasteners than conventional configurations described above. Thus, each fastener can carry less load, and the reliability of the hydrostatic transmission can increase.

The assembly 800 includes a drive shaft 812 that is rotatably coupled to the piston block of the hydraulic motor 202, such that as the piston block rotates, the drive shaft 812 rotates as well. The assembly 800 further includes a rotatable disk 814 mounted and coupled to the drive shaft 812, such that the rotatable disk 814 rotates with the drive shaft 812. As depicted in FIG. 8, the rotatable disk 814 has a hole pattern that can facilitate mounting a wheel of a vehicle (e.g., the wheel 110 or the wheel 112 of the mower 100) to the rotatable disk 814. With this configuration, as the drive shaft 812 rotates, the rotatable disk 814 and the wheel coupled thereto rotate, thereby propelling the vehicle.

When the vehicle is parked, the brake assembly 802 is used to brake the vehicle, e.g., prevent the vehicle from moving once parked (e.g., prevent the vehicle from rolling down a hill or move unintentionally after being parked). The brake assembly 802 differs from the brake assembly 204 in that the brake assembly 802 is mounted external to the housing 804 of the hydraulic motor 202.

Figure 9:
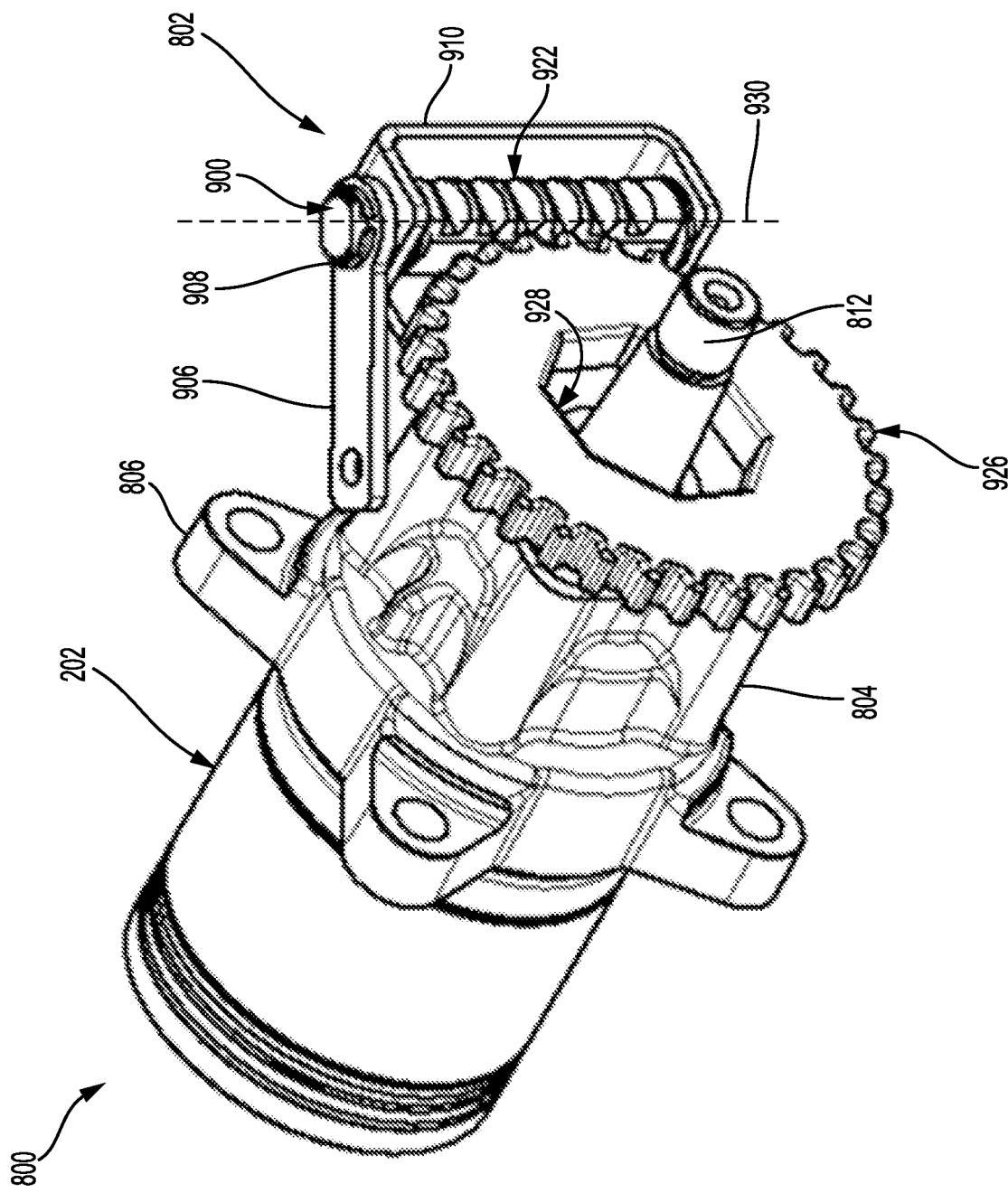
FIG. 9 illustrates a partial perspective view of the assembly of FIG. 8, in accordance with an example implementation.
Figure 10:
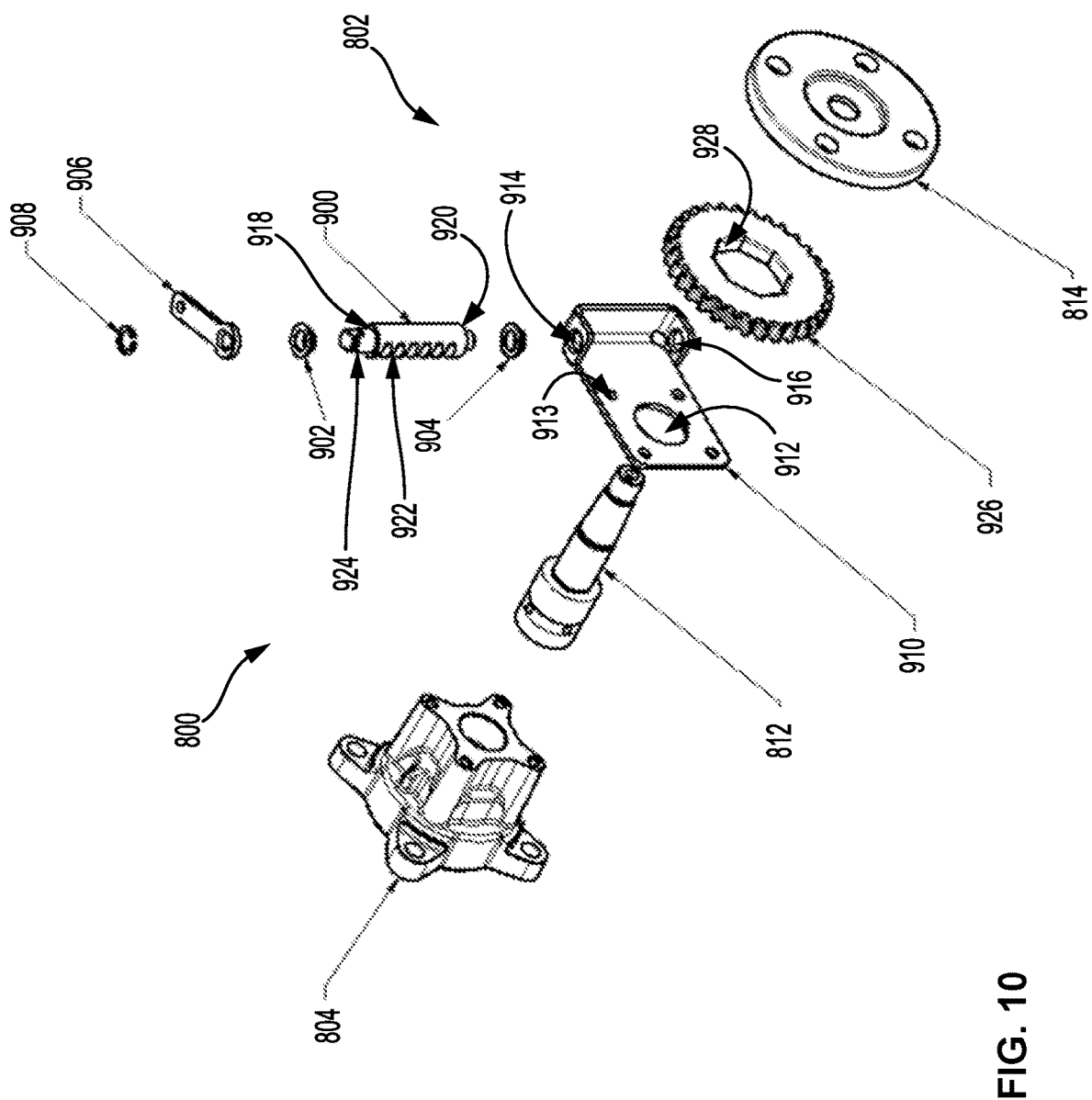
FIG. 10 illustrates a partial exploded view of the assembly of FIG. 8, in accordance with an example implementation.

FIG. 9 illustrates a partial perspective view of the assembly 800, and FIG. 10 illustrates a partial exploded view of the assembly 800, in accordance with an example implementation. Particularly, FIG. 9 illustrates the assembly 800 without the rotatable disk 814, and FIG. 10 illustrates an exploded view of the assembly 800 without the hydraulic motor 202. FIGS. 9-10 illustrates details of the brake assembly 802 and are described together.

The brake assembly 802 includes a brake shaft 900, a first bushing 902 mounted to a first end of the brake shaft 900, a second bushing 904 mounted to a second end (opposite the first end) of the brake shaft 900), a brake lever 906, and a retaining ring 908. The brake assembly 802 can also include a torsional spring (not shown) similar to the torsional spring 306 described above.

The brake assembly 802 further includes a bracket 910. The bracket 910 has a hole 912 that allows the drive shaft 812 to be disposed therethrough. The bracket 910 also has a hole pattern (e.g., including hole 913) that facilitates coupling the bracket 910 to the housing 804, which has a corresponding hole pattern, via fasteners.

The bracket 910 further has a hole 914 and a hole 916 that facilitate mounting the brake shaft 900 therethrough. With this configuration, the brake shaft 900 is disposed transversely relative to the drive shaft 812, e.g., a longitudinal axis of the brake shaft 900 is perpendicular to a respective longitudinal axis of the drive shaft 812.

The first bushing 902 is mounted to the bracket 910 through the hole 914, and the second bushing 904 is mounted to the bracket 910 through the hole 916. The brake shaft 900 has a shoulder 918 that rests against or interfaces with the first bushing 902, and has a shoulder 920 that rests against or interfaces with the second bushing 904. With this configuration, the brake shaft 900 is configured to be retained in a longitudinal direction within the bracket 910.

Similar to the brake shaft 302, the brake shaft 900 includes gear teeth 922 on a portion of the brake shaft 900. The gear teeth 922 are formed on a longitudinal portion as well as a circumferential portion of the brake shaft 900. In other words, the gear teeth 922 are formed on one side of the circumference of the brake shaft 900, while the other side or portion of the circumference is non-teethed (i.e., has no gear teeth). The other side of the brake shaft 900 that does not include teeth can be flat or cylindrical.

In an example, the gear teeth 922 are straight teeth or non-angled teeth, and in this example, the brake shaft 900 is configured as a gear rack. In another example, the teeth can be angled similar to a worm, and in this example, the brake shaft 900 can be referred to as a worm screw that can have helical or spiral teeth.

The brake lever 906 is mounted to a neck portion 924 of the brake shaft 900. The retaining ring 908 is then mounted to the brake lever 906 about the neck portion 924 to retain and couple the brake lever 906 to the brake shaft 900. As depicted, the neck portion 904 has a square or rectangular profile, and the brake lever 906 has a corresponding profile. With this configuration, the brake lever 906 can rotate the brake shaft 900 about its longitudinal axis.

The assembly 800 further includes a brake gear 926, which can be considered part of the brake assembly 802. The brake gear 926 is retained axially (along the axis of the drive shaft 812) between the bracket 910 and the rotatable disk 814.

The brake gear 926 is rotatably coupled to the drive shaft 812, directly or indirectly. In an example, the brake gear 926 can be mounted to the drive shaft 812, similar to the brake gear 320 being mounted to the drive shaft 214. In another example as shown in FIGS. 9-10, rather than being mounted to the drive shaft 812, the brake gear 926 is mounted to the rotatable disk 814. Particularly, the rotatable disk 814 has a hub (not show in FIG. 10) facing the brake gear 926), and the brake gear 926 is mounted to the hub.

For example, the brake gear 926 can be coupled to the hub of the rotatable disk 814 via any mechanism (e.g., key, keyway, and key slot). In the example implementation of FIGS. 9-10, the hub of the rotatable disk 814 has an external hexagonal interface formed on an exterior surface thereof, and the brake gear 926 has an internal hexagonal interface 928. The brake gear 926 is mounted to the hub of the rotatable disk 814, such that the external hexagonal interface of the hub of the rotatable disk 814 interfaces with the internal hexagonal interface 928. This way, as the rotatable disk 814 rotates (due to rotation of the drive shaft 812), the brake gear 926 rotates therewith. A hexagonal shape is used herein as an example, and other polygonal shapes could be used.

The brake gear 926 is configured to correspond to the gear teeth 922 of the brake shaft 900. For example, if the gear teeth 922 are straight teeth, the brake gear 926 is configured as a spur gear as shown in FIGS. 9-10. If the gear teeth 922 are helical or spiral, the brake gear 926 is configured as a helical gear, and so on.

The brake assembly 802 is configured as a parking brake that can be engaged and disengaged based on the rotational position of the brake lever 906. Particularly, the brake lever 906 is configured to rotate the brake shaft 900 about the longitudinal axis 930 between (i) a first position at which the gear teeth 922 of the brake shaft 900 are disengaged from the brake gear 926, thereby allowing the brake gear 926, the rotatable disk 814, and the drive shaft 812 to rotate, and (ii) a second position at which the gear teeth 922 of the brake shaft 900 engage the brake gear 926, thereby precluding the brake gear 926, the rotatable disk 814, and the drive shaft 812 from rotating (i.e., braking position).

When the gear teeth 922 of the brake shaft 900 are disengaged from the brake gear 926 as shown in FIG. 9, the brakes are disengaged, and the drive shaft 812 rotates freely.

Conversely, when the brake shaft 900 rotates via the brake lever 906, e.g., clockwise from a top view perspective in FIG. 9, about a longitudinal axis 930 of the brake shaft 302 to cause the gear teeth 922 of the brake shaft 900 to engage with the teeth of the brake gear 926, the brakes are engaged. As such, the drive shaft 812 is precluded from rotation due to positive locking of the brake shaft 900 with the brake gear 926.

Figure 11:
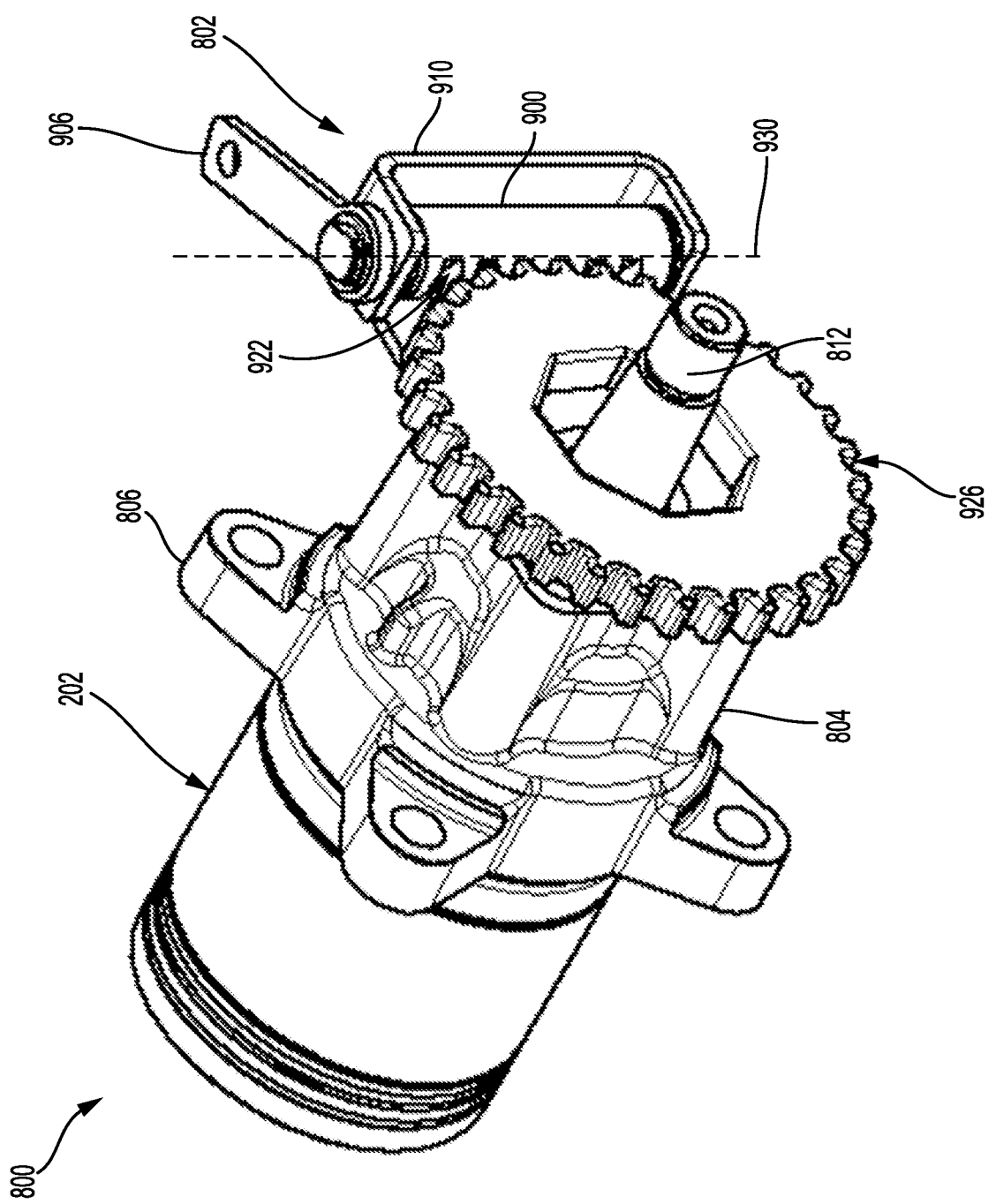
FIG. 11 illustrates a partial perspective view of the assembly of FIG. 8 showing a gear teeth of a brake shaft engaged with a brake gear, in accordance with an example implementation.

FIG. 11 illustrates a partial perspective view of the assembly 800 showing the gear teeth 922 of the brake shaft 900 engaged with the brake gear 926, and FIG. 12 illustrates a front view of the assembly 800 when the gear teeth 922 of the brake shaft 900 are engaged with the brake gear 926, in accordance with an example implementation. The vehicle may have a button or lever mechanism that is coupled (e.g., mechanically, fluidly, or electrically) to the brake lever 906 to enable the operator to rotate the brake lever 906 and engage the brakes.

Thus, the operator can rotate the brake lever 906 (e.g., clockwise from a top view perspective in FIGS. 8-9) to the position shown in FIGS. 11-12. In this position, the gear teeth 922 of the brake shaft 900 engages the teeth of the brake gear 926 as depicted in FIGS. 11-12.

The brake shaft 900 is substantially constrained from moving in a longitudinal direction (i.e., along the longitudinal axis 930) by the first bushing 902 in one direction (upward direction) and the second bushing 904 in the opposite direction (downward direction). The term "substantially constrained" is used herein to indicate that the brake shaft 900 is configured to have only some "axial play" such that it can move or slide transversely (e.g., up and down in FIGS. 11-12) for a small distance along the longitudinal axis 930. Beyond such "axial play" the brake shaft 900 is constrained from moving. For example, the brake shaft 900 can move in either direction by less than 1.0 millimeter.

If the vehicle (e.g., the mower 100) is parked in a position where the drive shaft 812, the rotatable disk 814, and the brake gear 926 tend to rotate in a clockwise direction from the perspective of FIG. 12, the brake gear 926 drives the brake shaft 900 in a first direction, e.g., downward direction in FIG. 12. The shoulder 920 of the brake shaft 900 is then forced against the second bushing 904, which thus operates as a stop that prevents the brake shaft 900 from moving further in a downward direction. As a result, the brake gear 926, the rotatable disk 814, and the drive shaft 812 are also precluded from rotating, i.e., brakes are applied and the vehicle does not move.

Conversely, if the vehicle (e.g., the mower 100) is parked in a position where the drive shaft 812, the rotatable disk 814, and the brake gear 926 tend to rotate in a counterclockwise direction from the perspective of FIG. 12, the brake gear 926 drives the brake shaft 900 in a second direction (e.g., upward direction in FIG. 12) opposite the first direction. The shoulder 918 of the brake shaft 900 is then forced against the first bushing 902, which thus operates as a respective stop that prevents the brake shaft 900 from moving further in an upward direction. As such, the brake shaft 900 is precluded from moving in an upward direction. As a result, the brake gear 926, the rotatable disk 814, and the drive shaft 812 are also precluded from rotating, i.e., brakes are applied and the vehicle does not move.

Thus, when the brake lever 906 rotates the brake shaft 900 to the position shown in FIGS. 11-12, the brakes are applied and the vehicle remains stationary. The rotational force of the drive shaft 812 and the brake gear 926 (e.g., resulting from the weight of the vehicle disposed on an inclined surface) is transmitted as a linear force to the brake shaft 900, which is then precluded from moving via the first bushing 902 and the second bushing 904.

When the brake shaft 900 is in the position shown in FIGS. 11-12, it is loaded in a given direction, e.g., it supports the weight of the vehicle positioned on a ramp, for example. In an example, the first bushing 902 and the second bushing 904 can be made of a material (e.g., bronze) that can allow the brake shaft 900 to be forced against them and to rotate while in contact with them, without causing galling.

To release the brakes, the operator may rotate the brake lever 906 in the opposite direction to disengage the gear teeth 922 from the teeth of the brake gear 926. This way, the drive shaft 812 is again free to rotate.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is an assembly comprising: a brake shaft comprising gear teeth formed on a circumferential portion of the brake shaft, wherein the brake shaft is substantially constrained from moving in a longitudinal direction along a longitudinal axis of the brake shaft; and a brake gear that is rotatably coupled to a drive shaft of a motor, wherein the brake shaft is rotatable about the longitudinal axis between (i) a first position at which the gear teeth of the brake shaft are disengaged from the brake gear, thereby allowing the brake gear and the drive shaft to rotate, and (ii) a second position at which the gear teeth of the brake shaft engage the brake gear, thereby precluding the brake gear and the drive shaft from rotating due to the brake shaft being constrained from moving in the longitudinal direction.

EEE 2 is the assembly of EEE 1, further comprising: a brake lever coupled to the brake shaft and configured to rotate the brake shaft about the longitudinal axis between the first position and the second position at which the gear teeth of the brake shaft engage the brake gear, thereby precluding the brake gear and the drive shaft from rotating.

EEE 3 is the assembly of any of EEEs 1-2, further comprising: a torsional spring coupled to the brake shaft and configured to bias the brake shaft to the first position or the second position.

EEE 4 is the assembly of any of EEEs 1-3, further comprising: a housing of the motor, wherein the housing comprises a cavity, wherein the brake shaft is disposed in the cavity within, at least partially, the housing; and a fitting threadedly engaged with the housing and configured to receive a portion of the brake shaft therein, such that the fitting operates as a stop constraining movement of the brake shaft in a first longitudinal direction, wherein an interior surface of the housing operates as a respective stop constraining movement of the brake shaft in a second longitudinal direction, opposite the first longitudinal direction.

EEE 5 is the assembly of any of EEEs 1-4, wherein the drive shaft comprises an external polygonal interface, wherein the brake gear comprises an internal polygonal interface mating with the external polygonal interface of the drive shaft to couple the brake gear to the drive shaft.

EEE 6 is the assembly of any of EEEs 1-5, wherein the brake shaft is mounted transversely with respect to the drive shaft, such that the longitudinal axis of the brake shaft is perpendicular to a respective longitudinal axis of the drive shaft.

EEE 7 is the assembly of any of EEEs 1-6, further comprising: a rotatable disk mounted to the drive shaft and comprising a hub, wherein the brake gear is mounted to the hub of the rotatable disk.

EEE 8 is the assembly of EEE 7, further comprising: a bracket mounted to the drive shaft, wherein the brake shaft is retained in the longitudinal direction within the bracket, and wherein the brake gear is interposed between the rotatable disk and the bracket.

EEE 9 is the assembly of EEE 8, further comprising: a first bushing mounted at a first end of the drive shaft through a first hole in the bracket, wherein the first bushing operates as a stop constraining movement of the brake shaft in a first longitudinal direction; and a second bushing mounted to a second end of the drive shaft, opposite the first end, through a second hole in the bracket, wherein the second bushing operates as a respective stop constraining movement of the brake shaft in a second longitudinal direction, opposite the first longitudinal direction.

EEE 10 is the assembly of any of EEEs 1-9, further comprising: a housing of the motor, wherein the brake shaft is mounted external to the housing.

EEE 11 is a vehicle comprising: a motor having a drive shaft configured as an output shaft of the motor; a wheel rotatably coupled to the drive shaft of the motor; and a brake assembly comprising: a brake shaft comprising gear teeth formed on a circumferential portion of the brake shaft, wherein the brake shaft is substantially constrained from moving in a longitudinal direction along a longitudinal axis of the brake shaft, and a brake gear that is rotatably coupled to the drive shaft of the motor, wherein the brake shaft is rotatable about the longitudinal axis between (i) a first position at which the gear teeth of the brake shaft are disengaged from the brake gear, thereby allowing the brake gear, the drive shaft, and the wheel to rotate, and (ii) a second position at which the gear teeth of the brake shaft engage the brake gear, thereby precluding the brake gear, the drive shaft, and the wheel from rotating due to the brake shaft being constrained from moving in the longitudinal direction.

EEE 12 is the vehicle of EEE 11, wherein the brake assembly further comprises: a brake lever coupled to the brake shaft and configured to rotate the brake shaft about the longitudinal axis between the first position and the second position at which the gear teeth of the brake shaft engage the brake gear, thereby precluding the brake gear and the drive shaft from rotating.

EEE 13 is the vehicle of any of EEEs 11-12, wherein the brake assembly further comprises: a torsional spring coupled to the brake shaft and configured to bias the brake shaft to the first position.

EEE 14 is the vehicle of any of EEEs 11-13, further comprising: a housing of the motor, wherein the housing comprises a cavity, wherein the brake shaft is disposed in the cavity within, at least partially, the housing, wherein the brake assembly further comprises: a fitting threadedly engaged with the housing and configured to receive a portion of the brake shaft therein, such that the fitting operates as a stop constraining movement of the brake shaft in a first longitudinal direction, wherein an interior surface of the housing operates as a respective stop constraining movement of the brake shaft in a second longitudinal direction, opposite the first longitudinal direction.

EEE 15 is the vehicle of any of EEEs 11-14, wherein the drive shaft comprises an external polygonal interface, wherein the brake gear comprises an internal polygonal interface mating with the external polygonal interface of the drive shaft to couple the brake gear to the drive shaft.

EEE 16 is the vehicle of any of EEEs 11-15, wherein the brake shaft is mounted transversely with respect to the drive shaft, such that the longitudinal axis of the brake shaft is perpendicular to a respective longitudinal axis of the drive shaft.

EEE 17 is the vehicle of any of EEEs 11-16, further comprising: a rotatable disk mounted to the drive shaft and comprising a hub, wherein the brake gear is mounted to the hub of the rotatable disk, and wherein the wheel is coupled to the rotatable disk.

EEE 18 is the vehicle of EEE 17, further comprising: a bracket mounted to the drive shaft, wherein the brake shaft is retained in the longitudinal direction within the bracket, and wherein the brake gear is interposed between the rotatable disk and the bracket.

EEE 19 is the vehicle of any of EEEs 11-18, wherein the brake assembly further comprises: a first bushing mounted at a first end of the drive shaft, wherein the first bushing operates as a stop constraining movement of the brake shaft in a first longitudinal direction; and a second bushing mounted to a second end of the drive shaft, opposite the first end, wherein the second bushing operates as a respective stop constraining movement of the brake shaft in a second longitudinal direction, opposite the first longitudinal direction.

EEE 20 is the vehicle of EEE 11, further comprising: a housing of the motor, wherein the brake shaft is mounted external to the housing.

What is claimed is:

1. An assembly comprising:
   a brake shaft comprising gear teeth formed on a circumferential portion of the brake shaft, wherein the brake shaft is substantially constrained from moving in a longitudinal direction along a longitudinal axis of the brake shaft; and
   a brake gear that is rotatably coupled to a drive shaft of a motor,
   wherein the brake shaft is rotatable about the longitudinal axis between (i) a first position at which the gear teeth of the brake shaft are disengaged from the brake gear, thereby allowing the brake gear and the drive shaft to rotate, and (ii) a second position at which the gear teeth of the brake shaft engage the brake gear, thereby precluding the brake gear and the drive shaft from rotating due to the brake shaft being constrained from moving in the longitudinal direction.

2. The assembly of claim 1, further comprising:
   a brake lever coupled to the brake shaft and configured to rotate the brake shaft about the longitudinal axis between the first position and the second position at which the gear teeth of the brake shaft engage the brake gear, thereby precluding the brake gear and the drive shaft from rotating.

3. The assembly of claim 1, further comprising:
   a torsional spring coupled to the brake shaft and configured to bias the brake shaft to the first position or the second position.

4. The assembly of claim 1, further comprising:
   a housing of the motor, wherein the housing comprises a cavity, wherein the brake shaft is disposed in the cavity within, at least partially, the housing; and
   a fitting threadedly engaged with the housing and configured to receive a portion of the brake shaft therein, such that the fitting operates as a stop constraining movement of the brake shaft in a first longitudinal direction, wherein an interior surface of the housing operates as a respective stop constraining movement of the brake shaft in a second longitudinal direction, opposite the first longitudinal direction.

5. The assembly of claim 1, wherein the drive shaft comprises an external polygonal interface, wherein the brake gear comprises an internal polygonal interface mating with the external polygonal interface of the drive shaft to couple the brake gear to the drive shaft.

6. The assembly of claim 1, wherein the brake shaft is mounted transversely with respect to the drive shaft, such that the longitudinal axis of the brake shaft is perpendicular to a respective longitudinal axis of the drive shaft.

7. The assembly of claim 1, further comprising:
   a rotatable disk mounted to the drive shaft and comprising a hub, wherein the brake gear is mounted to the hub of the rotatable disk.

8. The assembly of claim 7, further comprising:
   a bracket mounted to the drive shaft, wherein the brake shaft is retained in the longitudinal direction within the bracket, and wherein the brake gear is interposed between the rotatable disk and the bracket.

9. The assembly of claim 8, further comprising:
   a first bushing mounted at a first end of the drive shaft through a first hole in the bracket, wherein the first bushing operates as a stop constraining movement of the brake shaft in a first longitudinal direction; and
   a second bushing mounted to a second end of the drive shaft, opposite the first end, through a second hole in the bracket, wherein the second bushing operates as a respective stop constraining movement of the brake shaft in a second longitudinal direction, opposite the first longitudinal direction.

10. The assembly of claim 1, further comprising:
    a housing of the motor, wherein the brake shaft is mounted external to the housing.

11. A vehicle comprising:
    a motor having a drive shaft configured as an output shaft of the motor;
    a wheel rotatably coupled to the drive shaft of the motor; and
    a brake assembly comprising:
      a brake shaft comprising gear teeth formed on a circumferential portion of the brake shaft, wherein the brake shaft is substantially constrained from moving in a longitudinal direction along a longitudinal axis of the brake shaft, and
      a brake gear that is rotatably coupled to the drive shaft of the motor,
      wherein the brake shaft is rotatable about the longitudinal axis between (i) a first position at which the gear teeth of the brake shaft are disengaged from the brake gear, thereby allowing the brake gear, the drive shaft, and the wheel to rotate, and (ii) a second position at which the gear teeth of the brake shaft engage the brake gear, thereby precluding the brake gear, the drive shaft, and the wheel from rotating due to the brake shaft being constrained from moving in the longitudinal direction.

12. The vehicle of claim 11, wherein the brake assembly further comprises:
    a brake lever coupled to the brake shaft and configured to rotate the brake shaft about the longitudinal axis between the first position and the second position at which the gear teeth of the brake shaft engage the brake gear, thereby precluding the brake gear and the drive shaft from rotating.

13. The vehicle of claim 11, wherein the brake assembly further comprises:
    a torsional spring coupled to the brake shaft and configured to bias the brake shaft to the first position.

14. The vehicle of claim 11, further comprising:
    a housing of the motor, wherein the housing comprises a cavity, wherein the brake shaft is disposed in the cavity within, at least partially, the housing, wherein the brake assembly further comprises:
      a fitting threadedly engaged with the housing and configured to receive a portion of the brake shaft therein, such that the fitting operates as a stop constraining movement of the brake shaft in a first longitudinal direction, wherein an interior surface of the housing operates as a respective stop constraining movement of the brake shaft in a second longitudinal direction, opposite the first longitudinal direction.

15. The vehicle of claim 11, wherein the drive shaft comprises an external polygonal interface, wherein the brake gear comprises an internal polygonal interface mating with the external polygonal interface of the drive shaft to couple the brake gear to the drive shaft.

16. The vehicle of claim 11, wherein the brake shaft is mounted transversely with respect to the drive shaft, such that the longitudinal axis of the brake shaft is perpendicular to a respective longitudinal axis of the drive shaft.

17. The vehicle of claim 11, further comprising:
a rotatable disk mounted to the drive shaft and comprising a hub, wherein the brake gear is mounted to the hub of the rotatable disk, and wherein the wheel is coupled to the rotatable disk.

18. The vehicle of claim 17, further comprising:
a bracket mounted to the drive shaft, wherein the brake shaft is retained in the longitudinal direction within the bracket, and wherein the brake gear is interposed between the rotatable disk and the bracket.

19. The vehicle of claim 11, wherein the brake assembly further comprises:
a first bushing mounted at a first end of the drive shaft, wherein the first bushing operates as a stop constraining movement of the brake shaft in a first longitudinal direction; and
a second bushing mounted to a second end of the drive shaft, opposite the first end, wherein the second bushing operates as a respective stop constraining movement of the brake shaft in a second longitudinal direction, opposite the first longitudinal direction.

20. The vehicle of claim 11, further comprising:
a housing of the motor, wherein the brake shaft is mounted external to the housing.

* * * * *